Aug. 24, 1965   W. FIENI   3,202,076
MEANS FOR EXTRACTING AIR FROM THE BODY OF A VEHICLE
Filed Feb. 25, 1963   3 Sheets-Sheet 1

INVENTOR:
WALTER FIENI
BY
Robert Henderson
ATTORNEY

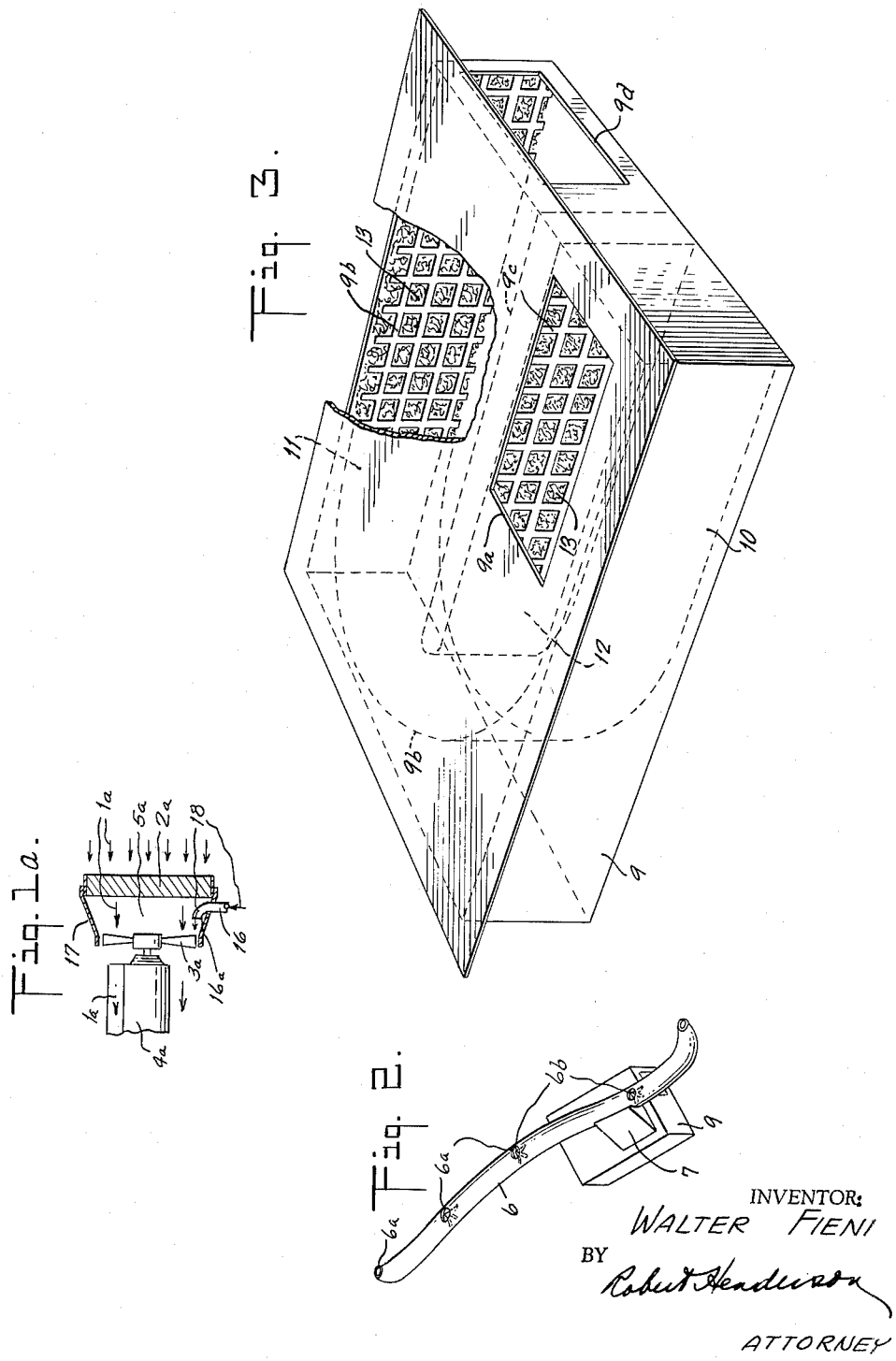

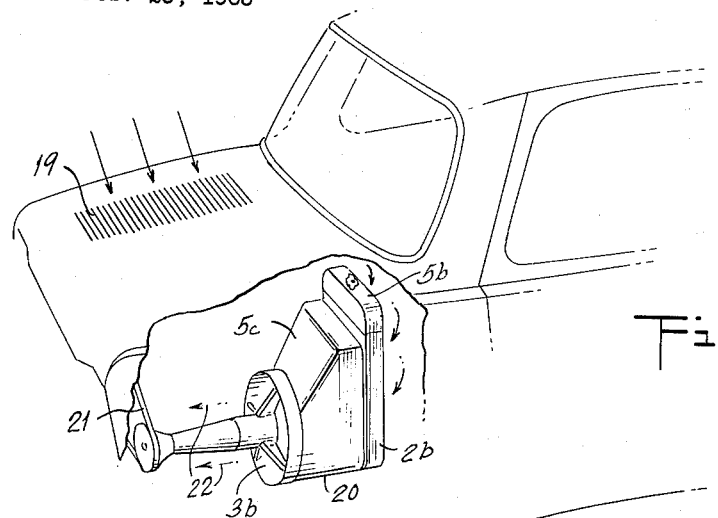
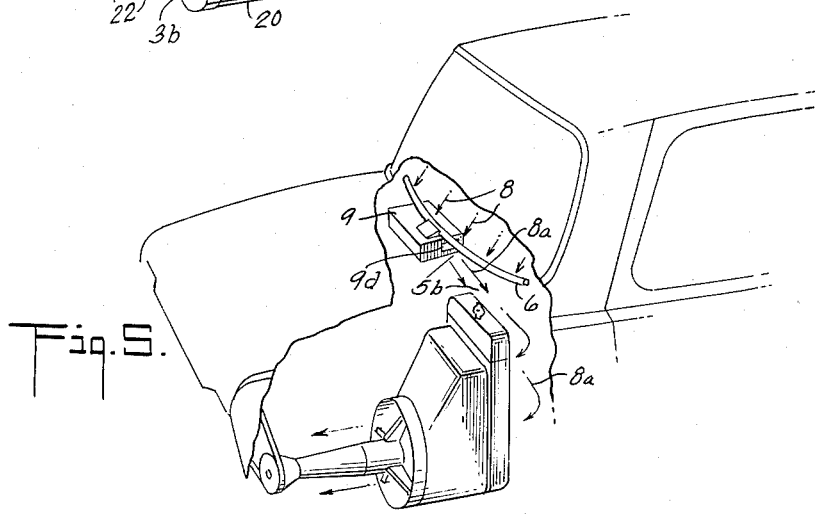
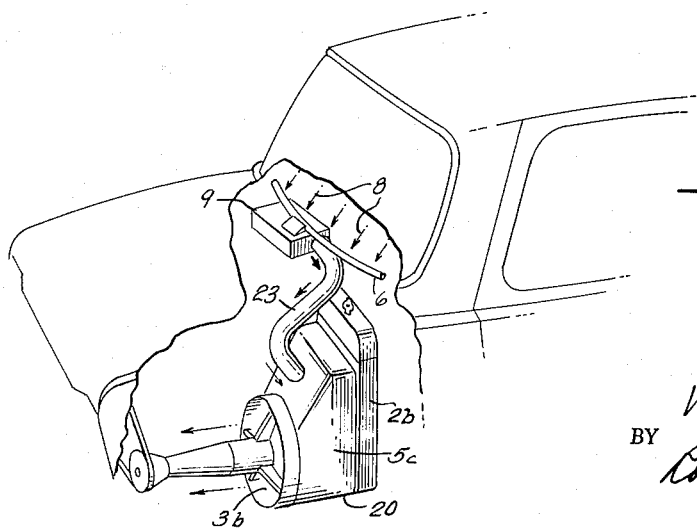

United States Patent Office 3,202,076
Patented Aug. 24, 1965

3,202,076
MEANS FOR EXTRACTING AIR FROM THE BODY OF A VEHICLE
Walter Fieni, Paris, France, assignor to Société Anonyme Francaise du Ferodo, Paris, France, a company of France
Filed Feb. 25, 1963, Ser. No. 260,617
Claims priority, application France, Feb. 26, 1962, 889,192
4 Claims. (Cl. 98—2)

This invention has for its object an arrangement for extracting air from the body of vehicles. It applies to all vehicles or conveyances in which the body has a closed compartment separate from the engine and adapted to receive persons or goods; the vehicle may be a conveyance running on the ground, such as a motor car or a lorry, or a machine running on rails, such as a rail car, or again a flying machine such as, for example, a helicopter.

Efforts have been made to improve the comfort and habitability of vehicles and in particular motor vehicles. Most vehicles which are contructed at the present time have a ventilating and heating system by means of which fresh or heated air may be introduced into the interior of the body. No practical means have been developed heretofore for removing to the external atmosphere air contained in the body so as to create a rational circulation of air inside the latter. One is generally content to allow the air to escape through openings, including openings which may be specially provided for this purpose if desired.

The present invention enables such means to be provided without resorting to any mechanical suction devices other than those which normally exist in a vehicle.

According to the present invention, communication is established between the interior of the body or a compartment therein and a zone of the vehicle which is always at a reduced pressure when the vehicle is operating, on account of the operation of the vehicle, and a sound-absorbing device is incorporated in this means of communication.

In a vehicle which is in operation there are generally several zones which are always at a reduced pressure whatever the speed of movement (and even at a standstill, with the engine idling) and whatever the wind. For example, there is the suction of the carburetor, and this suction may be made use of for the purpose in question, but a reduced pressure zone of an air circuit set up by the cooling means of the engine will preferably be used.

In a water-cooled engine, having a fan which draws air through a radiator, there is such a reduced pressure zone between the radiator and the fan. In an air-cooled engine the intake conduit, upstream of the fan, is at a reduced pressure and may be used for the desired purpose.

The zones of reduced pressure are generally located in the space occupied by the engine and are consequently very noisy. However, by placing a sound-absorbing device in the communicating means between the interior of the body and the zone of reduced pressure, an acceptable noise level is established in the vehicle body.

According to one feature of the invention particularly applicable to motor vehicles, there is placed in communication with the reduced pressure zone, an air intake constituted by one or more nozzles or orifices disposed in the vicinity of the rear window and directed in such manner that the latter is swept by the stream of air drawn in. As the air inlet to the interior of the body is generally located near the front thereof, a rational circulation is thus obtained; moreover, a demisting effect is obtained at the rear window.

According to another feature of the invention, the space between the flanges of profiled side members which run from front to back at the lower part of most types of vehicles, and more particularly motor vehicles, is used to place the air intake orifices in the body in communication with the reduced pressure zone. This arrangement is applied with advantage when the reduced pressure zone is located at the front of the vehicle, and the air intake orifices at the rear of the interior space of the vehicle body.

The description which follows and which is given with reference to the accompanying drawings, but by way of non-limitative example only, will make clear the various features of the invention and the way in which they are carried into effect.

FIGURE 1a shows, in vertical section on the medial plane of the vehicle, the front part of the engine and the radiator of another type of motor car, together with the end of an air extraction conduit;

FIGURE 2 is a perspective view of an air extraction intake element as employed in connection with the arrangements shown in FIGURES 1 and 2, drawn to a larger scale;

FIGURE 3 is a perspective view on a still larger scale, of a sound absorber with parts broken away;

FIGURE 4 shows the rear part of a rear-engined motor car, the car being seen in perspective and being broken away to show the path of the cooling air of the engine in a conventional arrangement, and FIGURES 5 and 6 are views similar to FIGURE 4 but showing, respectively, two different forms of device according to the invention fitted to the car of FIGURE 4.

Figure 1:
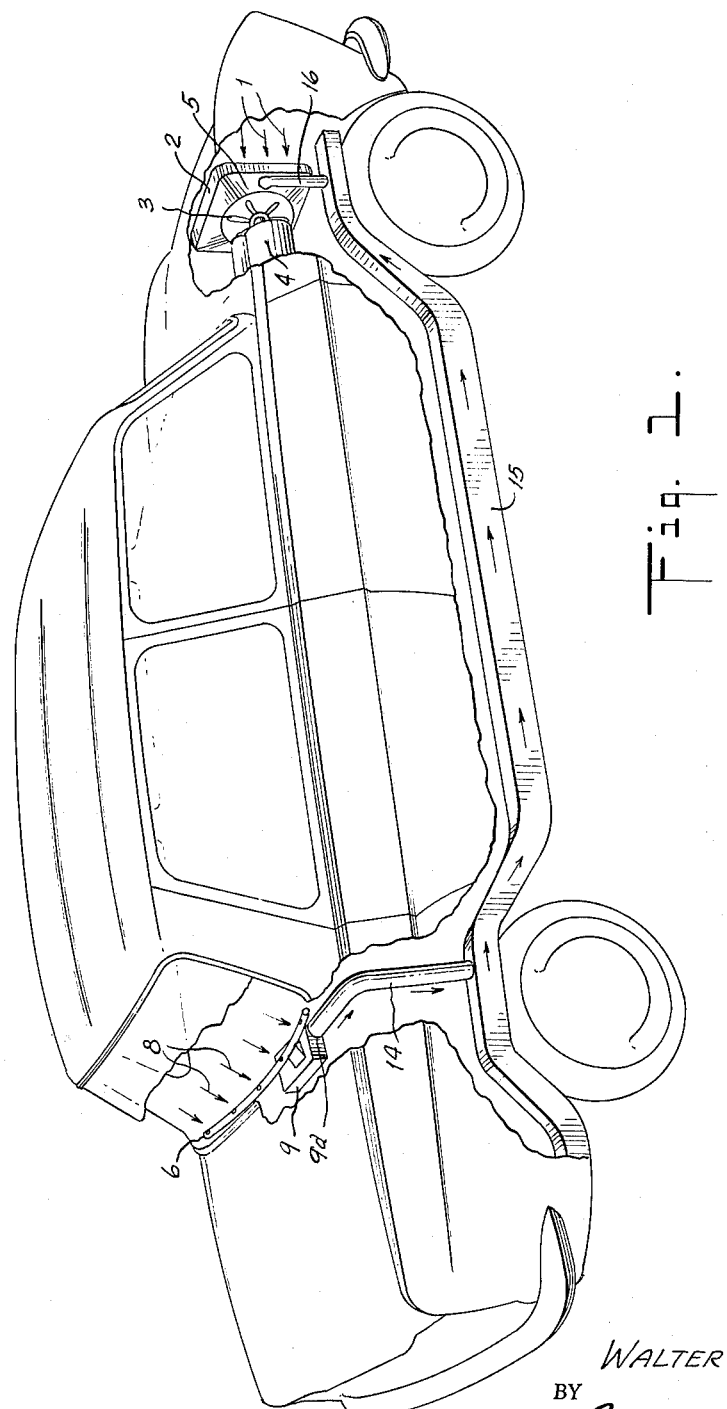
FIGURE 1 is a perspective view of a motor car having its engine at the front, the drawing being partly broken away and showing one form of air extracting arrangement according to the invention.

Referring to FIGURE 1, cooling air for the engine is normally sucked in in the manner indicated diagrammatically by the arrows 1, so as to pass through the radiator 2. The air is sucked by a fan 3 driven by the engine 4. The passage of the stream of air through the radiator imposes a loss of pressure on the stream and, in the space 5 located between the radiator 2 and the fan 3, the air is always at a very substantially reduced pressure with respect to the exterior of the radiator. This reduced pressure is produced by the very operation of the fan and obtains whatever the speed of the vehicle and whatever the wind. When the windows of the passenger compartment are closed, the pressure inside the compartment may be higher than, equal to or even slightly lower than, the external pressure but it is always substantially higher than the pressure in the zone 5 when the fan 3 is rotating. It is this relatively reduced pressure in the zone 5 which is used, according to the invention, to achieve the extraction of air from inside the vehicle.

The air extraction element 6, which is shown on a larger scale in FIGURE 2, is located inside the car or other vehicle at the base of the rear window and is constituted by a tube which has orifices 6a (FIGURE 2) and is connected at 7 to the suction system. Preferably, the tube 6 is equipped internally with conical baffle members 6b to equalize the suction flow rates of the orifices 6a. The element or tube 6 is disposed in extension below the rear window, the axes of the orifices 6a being substantially tangential to the interior surface of the window, which is thus swept by the air drawn into the orifices 6a as represented diagrammatically by the arrows 8.

The connection 7 (FIGURE 2) leads to a silencer 9, which is shown in detail in FIGURE 3, and communicates with the inlet 9a of the latter. Referring to FIGURE 3, the silencer 9 comprises, inside a sheet metal casing, a peripheral wall 9b of perforated sheet metal and a double-walled baffle-plate 9c of perforated sheet metal defining two chambers 10 and 11 communicating with, respectively, the inlet opening 9a and the outlet opening 9d. A filling 13 consisting of an absorbent material such as glass wool is disposed between the perforated plate 9b and the outer casing and also between the two perforated sheet metal walls of the baffle plate 9c. The chambers 10 and 11 intercommunicate beyond one end of the baffle plate 9c, by way of the opening 12; the air enters at 9a and issues at 9d after passing through the circuit comprising the chamber 10, the opening 12 and the chamber 11. Any noises which there might be downstream of the outlet 9d are absorbed in known manner by the perforated sheet metal and the glass wool, so that the noise level upstream of the inlet 9a is very distinctly lower. A deadening of the order of 10 decibels is easily obtained with a device of this form.

Referring again to FIGURE 1, there will be seen a connecting tube 14 fitted at one end to the outlet 9d of the silencer 9 and opening at the other end inside a side member 15 of the car. The member 15 forms part of the normal structure of the car and runs from the rear to the front; it is constituted by a U-section member and, in order to transform it into an air conduit, it is sufficient merely to unite the edges of its side-limbs or flanges with a metal strip and to plug its ends. At the front of the side member 15, converted in this way into an air conduit, there is fitted a tube 16 which opens into the zone 5.

By reason of the reduced pressure in the zone 5 in comparison with the interior of the vehicle, air in the latter is drawn in the direction of the arrows 8, sweeping over the rear window and demisting it. The air passes through the orifices 6a into the tubular element 6 and from there into the silencer 9, from which it issues at 9d. As has been seen, it then passes through the tube 14, the conduit constituted by the member 15 and the tube 16 to arrive at the zone 5. Engine noise penetrating into the tubes or conduits 16, 15 and 14 and any noise which might possibly arise therein due to resonance is deadened by the silencer 9. The precaution has been taken of placing the silencer very close to the suction or intake element 6 and the deadening of 10 decibels produced by the silencer is therefore sufficient to ensure an acceptable noise level in the vehicle.

The arrangement shown in FIGURE 1a is applicable to vehicles in which the fan 3a can be disconnected in certain circumstances, the stream of air indicated by the arrows 1a, which is produced by the movement of the vehicle, then alone ensuring adequate cooling in the radiator 2a, of the circulation water of the engine 4a.

In this type of vehicle, the air is advantageously guided or channelled between the radiator and the fan by means of a sheet metal cone 17, so as to define a zone 5a in which the flow of air is accelerated. It is then sufficient to arrange for the tube 16 to penetrate into this zone and to bend its end portion 16a towards the rear to form a Venturi nozzle by means of which air is drawn by induction in the direction of the arrows 18 so as to permit extraction from the interior of the vehicle, by way of an element such as the element 6 of FIGURE 1. When the fan is connected, the reduced pressure produced by it increases the suction effect.

In FIGURE 4, which shows a type of motor car with its engine at the rear, the arrows represent diagrammatically the path of cooling air which passes through slots 19 in the hood or bonnet, enters the radiator 2b and is channelled by the cone 20 towards the fan 3b, which is driven by a belt 21 driven by the engine. The air is discharged in the direction of the arrows 22 by way of slots (not shown) at the rear of the hood or bonnet. In this type of vehicle, the slots 19 cause loss of pressure in the air stream, so that the zone 5b in front of the radiator 2b is at reduced pressure. This zone 5b may be defined by continuous or discontinuous partitions (not shown) arranged to form a passage to take up or guide substantially all the flow of air upstream of the radiator. The zone 5c, inside the cone 20, is at an even more reduced pressure than the zone 5b.

In the arrangement shown in FIGURE 5, the reduced pressure in the zone 5b is utilized for carrying the invention into effect. The extraction element 6 and the silencer 9 are arranged as in FIGURE 1. In the arrangement shown, the outlet orifice 9d of the silencer opens directly into the zone 5b. If the zone 5b were defined by a passage, which is referred to above but not shown, the outlet 9d would be connected to this passage by a sleeve (not shown).

In the arrangement shown in FIGURE 6, the outlet 9d of the silencer is connected to the cone 20 by a pipe 23 so as to utilize the reduced pressure in the zone 5c.

It is obvious that the arrangements described are examples only and that they could be modified, in particular by substituting equivalent technical means, without thereby departing from the scope of the invention. In particular, it is possible to utilize reduced pressure zones other than those which result from the flow of the cooling air of the engine. Moreover, it is not essential to carry out the extraction of air against the rear window; in particular, in vehicles other than saloon cars the extraction can be carried out at places ensuring the most rational circulation of air.

What is claimed is:

1. The combination in a motor vehicle of a passenger compartment therein, a motor for propelling said vehicle, cooling means for cooling said motor, and ventilating means for ventilating said compartment; said cooling means including a fan, driven by said motor, and operable to establish a flow of motor-cooling air through the fan whereby there is formed, at the air-intake side of the fan, a low pressure zone of lower pressure than the pressure in said compartment, and said ventilating means comprising an air duct, opening at one end thereof in a rear area of said compartment, and opening, at its other end, in said low pressure zone, whereby air in said compartment moves from the latter, through said duct, and into said low pressure zone.

2. A combination according to claim 1, said cooling means including a radiator disposed in spaced relation from said fan at the air-intake side of the latter in said flow of air; said zone of low pressure being the space between said radiator and said fan.

3. A combination according to claim 2, said passenger compartment being located rearwardly in the vehicle, relatively to said motor, fan, and radiator, and said air duct extending longitudinally of the vehicle and below said passenger compartment.

4. A combination according to claim 3, further including an air-passing, sound-absorbing device located in said duct adjacent to the end of the latter which opens into said compartment, for minimizing the passage of sound from said low pressure zone and from said duct to said compartment.

References Cited by the Examiner
UNITED STATES PATENTS
2,681,608  6/54  Wunderlich _____ 98—2

FOREIGN PATENTS
476,787  12/37  Great Britain.

MEYER PERLIN, Primary Examiner.
ROBERT A. O'LEARY, EDWARD J. MICHAEL,
Examiners.